No. 873,546. PATENTED DEC. 10, 1907.
J. HEDRICK.
HOOF PARER.
APPLICATION FILED MAR. 23, 1907.
2 SHEETS—SHEET 1.
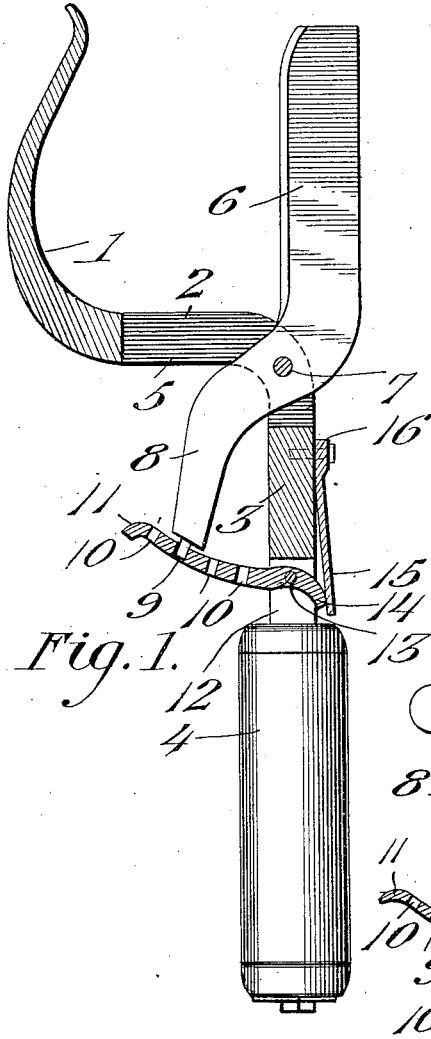
Fig. 1.
Fig. 2.
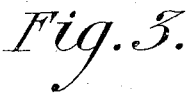
Fig. 3.
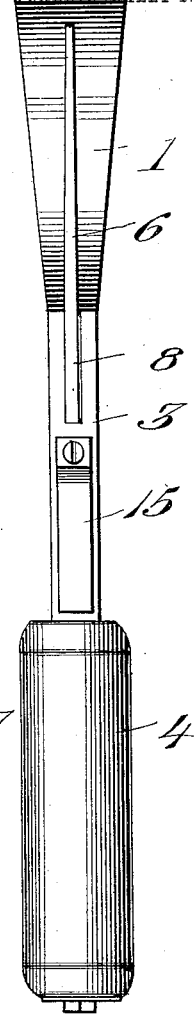
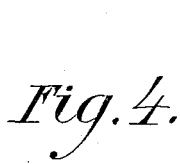
Fig. 4.
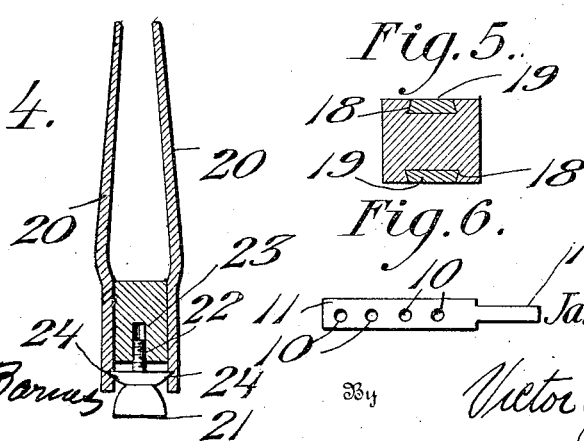
Fig. 5.
Fig. 6.
Witnesses
Phil. S. Barnes
E. R. Brunyea
Inventor
James Hedrick
By
Victor J. Evans
Attorney
THE NORRIS PETERS CO., WASHINGTON, D. C.

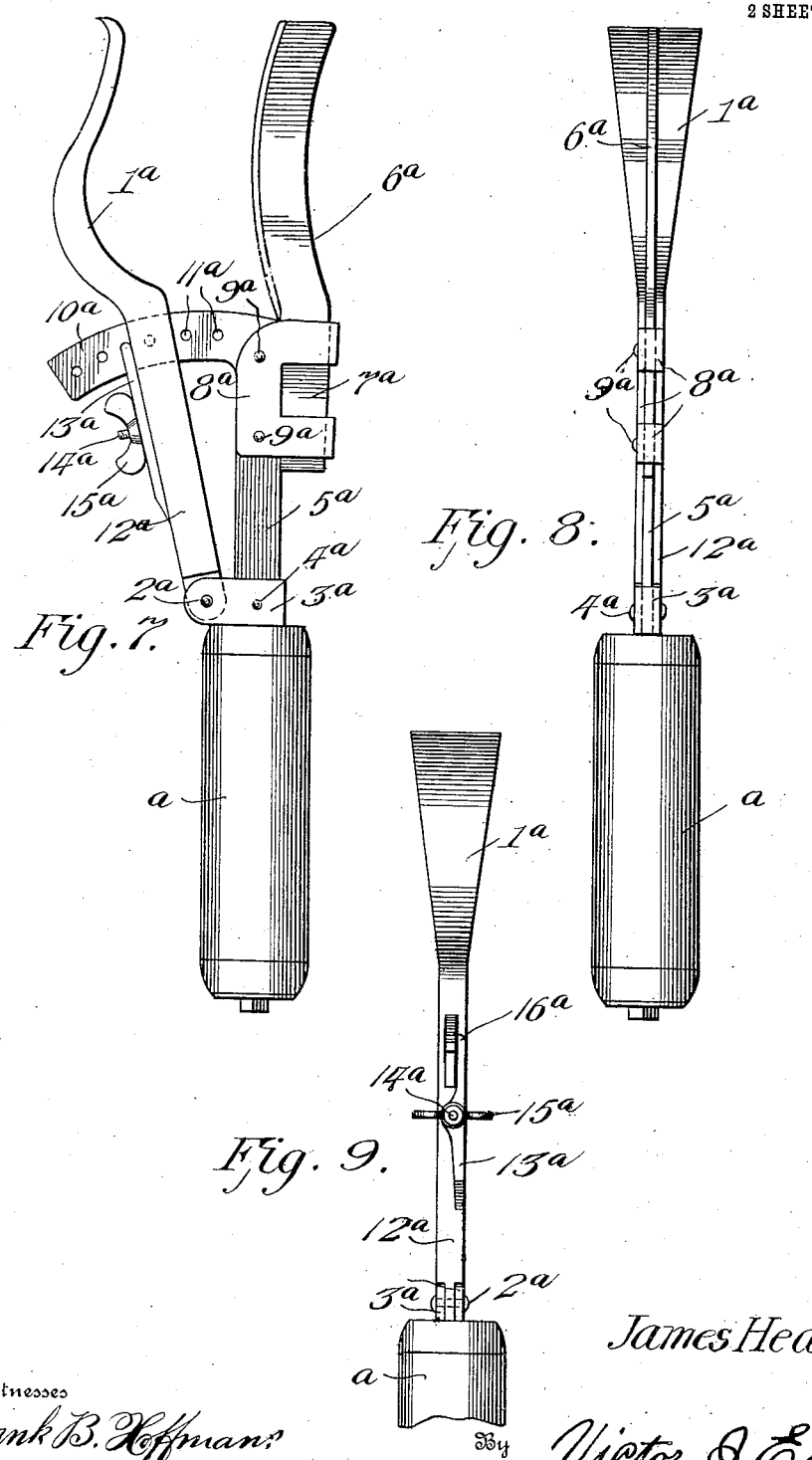

UNITED STATES PATENT OFFICE.

JAMES HEDRICK, OF FAVONIA, VIRGINIA.

HOOF-PARER.

No. 873,546.  Specification of Letters Patent.  Patented Dec. 10, 1907.

Application filed March 23, 1907. Serial No. 364,100.

*To all whom it may concern:*

Be it known that I, JAMES HEDRICK, a citizen of the United States, residing at Favonia, in the county of Wythe and State of Virginia, have invented new and useful Improvements in Hoof-Parers, of which the following is a specification.

This invention relates to hoof parers, the object of the invention being to provide a simple and effective farrier's implement for cutting and trimming a horse's hoof preparatory to applying the shoe thereto and fastening the same thereon.

By means of the implement hereinafter described, the hoof may be pared or trimmed with the greatest possible accuracy, and the implement is so constructed that it is rendered adjustable to hoofs of different sizes, thus rendering the implement as a whole universal in its use.

With the above and other objects in view, the invention consists in the novel construction, combination and arrangement of parts, hereinafter more fully described, illustrated and claimed.

In the accompanying drawings, Figure 1 is a sectional elevation of a hoof parer embodying the present invention. Fig. 2 is an edge view of the same. Fig. 3 is a sectional view of a hoof parer embodying a double knife or cutter. Fig. 4 is a detail longitudinal section through the double cutter. Fig. 5 is a cross-section through the double cutter, showing the manner of securing the tangs of the cutting blades in place. Fig. 6 is a detail plan view of the spring-pressed detent. Fig. 7 is a side elevation of a modified form of hoof parer embodying my invention. Fig. 8 is an edge view of the same. Fig. 9 is a similar view looking at the opposite edge of the tool.

Referring to the drawings, 1 designates the main bearing or positioning crook which is adapted to rest against the outer side of the hoof during the manipulation of the implement. The base of the crook 1 extends transversely with reference to the length of the handle, as shown at 2, and then extends inward in the plane of the handle to form a shank 3, to which is fitted a suitable handle 4. The transverse portion 2 of the crook is slotted, as shown at 5, to receive the body of a paring cutter 6 which is pivotally connected at 7 to the shank 3 of the crook, as clearly shown in Fig. 1.

Referring to Figs. 1 and 3, the cutter 6 is provided with an inwardly extending tang 8 terminating in a projecting stud 9 which is received in any one of a series of holes or sockets 10, in a detent 11 which passes through a slot 12 in the shank 3, and is pivotally mounted at 13 therein. The detent 11 extends in rear of the pivot 13 to provide a heel end extension 14, against which presses the free end of a leaf-spring 15, secured at its opposite end 16 to the shank 3.

By means of the construction just described, the inner sharpened edge of the cutter may be adjusted toward and away from the inner bearing face of the crook 1 to accommodate the implement as a whole to hoofs of different sizes, and to enable a hoof to be pared with accuracy. The cutter 6 is adjusted by pressing the end of the detent 11 away from the tang 8 and moving the stud 9 so as to enter any desired hole or socket 10 in the detent, the detent being held in engagement with the stud 9 by means of the spring 15.

Instead of forming the cutter integrally with the tang 8, the tang may be extended beyond the pivot to form a short shank 17 which is provided at opposite sides with dove-tail grooves or recesses 18 adapted to receive, slidingly, the correspondingly dovetailed shanks or tangs 19 of a pair of cutting blades 20, as shown in Figs. 3, 4 and 5. These cutting blades are arranged to converge toward their outer extremities and are held in place relatively to the shank 17 by means of a cutter blade lock comprising a head or finger piece 21, a screw shank 22 which fits in a threaded opening 23 in the shank 17, and oppositely projecting shoulders or wings 24 which project in diametrically opposite places and enter corresponding notches or sockets in the inner faces of the tangs 19, as shown in Fig. 4. Either or both of the cutting blades 20 may be released by giving a partial turn to the head 21 of the lock, thus moving the shoulders 24 out of engagement with the notches in the tangs 19, whereupon the tangs are released and the cutting blades may be slid out of engagement with the dove-tail recesses in the shank 17. This enables the cutting blades to be sharpened and again replaced and fastened in position.

In the operation of the implement, the handle 4, in connection with the shank 3, constitutes a lever, the fulcrum of which is represented by the crook 1 which bears against the outer surface of the hoof, thus causing the cutter to operate with a shearing action on the hoof for trimming or paring and the like.

Referring to Figs. 7, 8 and 9 in which a modified form of my invention is illustrated, the numeral 1ª designates the positioning crook pivoted at 2ª upon a bearing plate 3ª secured at 4ª to the shank 5ª of the knife holder. The knife 6ª is provided with a shank 7ª secured in a double yoke 8ª riveted at 9ª to the shank 5ª. A curved arm 10ª formed integral with the shank 5ª is provided with a series of holes 11ª and secured to the shank 12ª of the positioning crook 1ª is a detent 13ª pivoted upon a screw 14ª, and provided with a winged nut 15ª for securing said detent in adjusted position. The detent 13ª is provided with a finger 16ª adapted to engage any one of the holes 11ª in the curved bar 10ª to hold the positioning crook at the required distance from the blade 6ª. The shank 5ª is suitably secured to a handle $a$, and the operation of the tool is in all respects identical with that already described.

I claim:

1. A hoof parer comprising a handle, a crook connected rigidly therewith, a cutter pivotally related to the crook, and means for adjusting said cutter to vary the distance between the cutter and the bearing face of the crook.

2. A hoof parer comprising a bearing crook having a shank, a handle on said shank, a paring cutter pivotally connected to said shank and provided with a tang, and a spring sustained detent mounted on the shank and engaging the tang and permitting the cutter to be adjusted to vary the distance between the cutter and the crook.

3. A hoof parer embodying a crook having a shank, a handle on said shank, a cutter pivotally connected to the shank and provided with a projecting tang, and a pivotally mounted spring sustained detent connected with the shank and provided with a plurality of sockets to engage the tang of the cutter and render said cutter adjustable as to its angle and distance relatively to the crook.

4. A hoof parer embodying a crook having a shank, a handle mounted on said shank, a hoof parer pivotally connected to the shank and provided with a tang, a detent mounted on the shank and having an adjustable engagement with said tang, said cutter embodying a plurality of cutting blades.

5. A hoof parer embodying a paring crook having a shank, a handle on said shank, and an adjustable cutter embodying a tang pivotally connected to said shank, a detent for engaging and rendering said tang adjustable, oppositely arranged cutting blades having tangs removably fitted in dove-tail recesses in an extension of said tang, and a locking device connected with said extension and having means to engage the tangs of the cutting blades for fastening the same in place, substantially as described.

6. A hoof parer comprising a handle, a knife connected to said handle, a positioning crook connected to said handle, means for permitting the adjustment of the knife and crook toward and from each other, and means for holding said parts in adjusted positions.

In testimony whereof, I affix my signature in presence of two witnesses.

JAMES HEDRICK.

Witnesses:
 E. LEE TRINKLE,
 GEORGIE RIGGLE.